April 11, 1961     C. L. ARNETT     2,978,766
SAFETY HOOK
Filed June 4, 1958
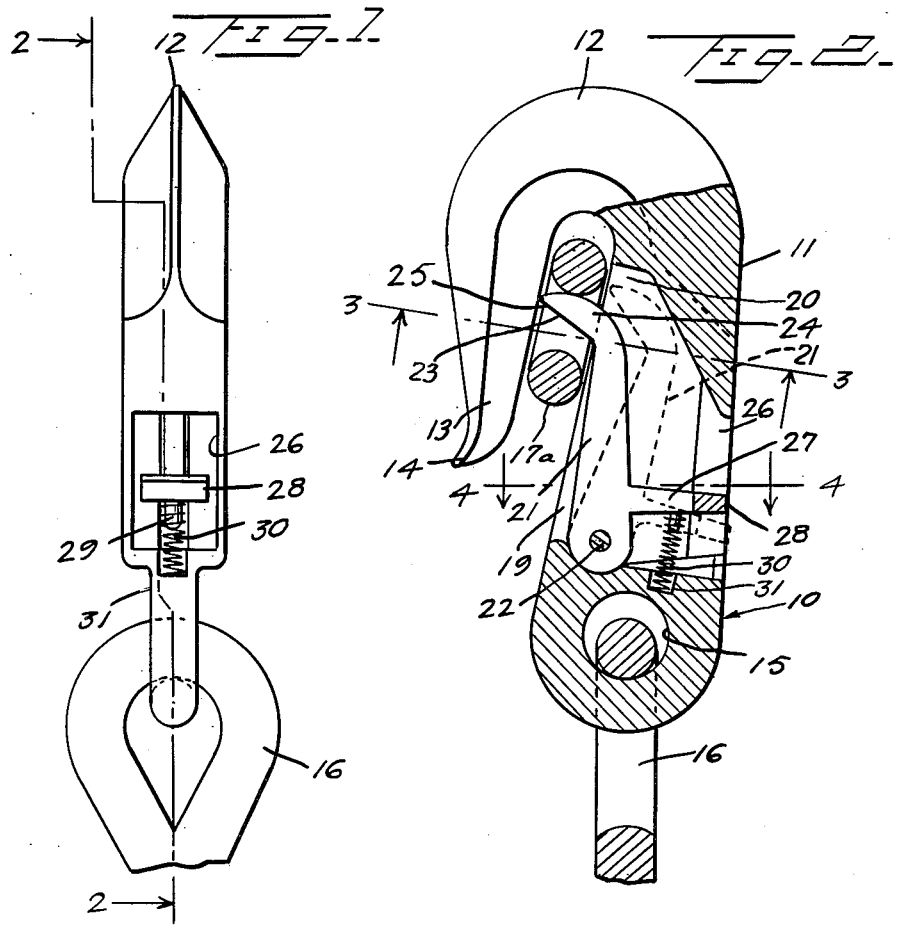
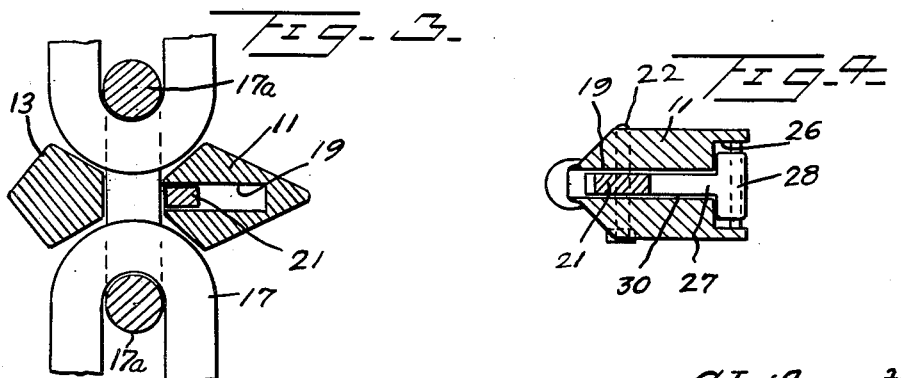
C. L. Arnett
INVENTOR
BY *CA Snow & Co.*
ATTORNEYS.

2,978,766

SAFETY HOOK

Charles L. Arnett, 3211 52nd Ave., Hyattsville, Md.

Filed June 4, 1958, Ser. No. 739,927

1 Claim. (Cl. 24—116)

This invention relates to a safety hook or grab hook, and has as its primary object the provision of such a hook characterized by an improved latch or securing means for the retention of a chain or the like grasped by said hook.

An additional object of the invention is the provision of such a latch means including a pivoted arm contained interiorly of said hook and having an arcuate projecting tongue adapted to engage interiorly of a link of a chain grasped by said hook.

Still another object of the invention is the provision of a thumb actuated arm associated with said pivoted member whereby the pivoted member may be manually retracted with a minimum of effort and difficulty.

Still another object of the invention is the provision of spring means associated with said latch member normally holding the same in link engaging position.

A still further object of the invention is the provision of a device of this character which is sturdy and durable in construction, reliable and efficient in operation, and relatively simple and inexpensive to manufacture, assemble and utilize.

Still other objects reside in the combinations of elements, arrangements of parts, and features of construction, all as will be more fully pointed out hereinafter, and disclosed in the accompanying drawing.

In the drawing:

Figure 1 is a rear elevational view of one form of safety hook embodying features of the instant invention.

Figure 2 is a sectional view taken substantially along the line 2—2 of Figure 1, as viewed in the direction indicated by the arrows, a portion of the chain link being shown in association with the device.

Figure 3 is a sectional view taken substantially along the line 3—3 of Figure 2 as viewed in the direction indicated by the arrows.

Figure 4 is a sectional view taken substantially along the line 4—4 of Figure 2 as viewed in the direction indicated by the arrows.

Similar reference characters refer to similar parts throughout the several views of the drawing.

Having reference now to the drawing in detail, the safety hook of the instant invention is generally indicated at 10, and includes a shank 11, a bight 12 and a hook 13 having an outwardly turned tip 14. The end of the shank 11 is provided with an aperture 15, which is adapted to engage the eye 16 of a supporting cable or the like. As best shown in Figure 3 the hook 13 and the shank 11 include inwardly extending tapered portions adapted to engage between adjacent links 17 of a chain, while an intermediate link 17a is adapted to seat lengthwise in the bight 12 between the hook 13 and the shank 11, the inner surface of the hook 13 being parallel with and spaced from the inner edge of said shank 11, the distance between said hook and shank being slightly less than the width of a chain link used with said hook.

The interior of the shank 11 is provided with an elongated recess or aperture 19, which has an opening 20 in the inner face thereof opposite the hook 13, and in which is mounted an arm 21 on a pivot pin 22. The arm 21 has an angled extremity 23, one surface of which is arcuate, as shown at 24, and which terminates in a point 25, which, in one position of adjustment, extends across the space between the confronting surfaces of said hook and shank locking a chain link within the space between the shank and hook, at a substantial distance within the space beyond the pointed end of said hook and seats against the inner face of the hook 13. When fully retracted, in a manner to be more fully described hereinafter, the arm 21 as shown in dotted lines in Figure 2, may seat completely within the recess 19. The rear portion of the shank 11 is provided with an enlarged opening 26, which is in communication with the slotted recess 19, and into which extends a projecting arm 27 which comprises a portion of the arm 21, and which is provided with an enlarged thumb engageable portion 28, and guarded by the outer surface of said shank which extends to a point closely adjacent the outer surface of the shank 11 and is guarded by the outer surface of said shank. A projection 29 extends downwardly from the underside of the projecting arm 27, and engages one end of a coiled spring 30, the opposite end of which is seated in a recess 31 in the bottom of the recess or opening 26.

From the foregoing the operation of the device should now be readily understandable. In grabbing a chain, a link 17a is adapted to slide into the bight of the hook, and engage against the inclined surface of the extremity 23, forcing the same inwardly into the recess 19, until one side of the link has seated in the bight 12, whereupon the spring 30 serves to bias the angled extremity of the arm 21 into the space interiorly of the link, and the point 25 into engagement with the inner side of the hook 13, thus securely holding the link 17a in the bight of the hook, and wedging the adjacent ends of the links 17 against the tapered portions at opposite sides of said shank and hook, as clearly shown by Figure 3 of the drawings. Obviously pressure of the link against the arcuate surface 24 of the extremity 23 will merely cause tighter engagement of the point 25 with the associated inner side of hook 13. When it is desired to release such engagement with the link, a light thumb pressure on the thumb engageable portion 28 will compress the spring 30, and rotate the arm 21 about its pivot 22, in such manner as to retract the point 25 of arm 21, and permit the ready release of the link 17a.

From the foregoing it will now be seen that there is herein provided an improved safety hook, which accomplishes all of the objects of this invention, and others, including many advantages of great practical utility and commercial importance.

As many embodiments may be made of this inventive concept, and as many modifications may be made in the embodiment herein before shown and described, it is to be understood that all matter herein is to be interpreted merely as illustrative and not in a limiting sense.

I claim:

A safety grab hook for attaching to a lifting chain, comprising a shank, a bight and a hook portion parallel with said shank, said hook portion having an outwardly curved pointed end, said shank and hook portion having inwardly inclined side walls, said shank having a recess in the inner surface thereof confronting said hook portion, the rear wall of said recess being inclined providing a stop, said shank also having an enlarged recess communicating with said first mentioned recess and opening on the outer side of said shank, a latch arm having an outwardly inclined end, pivotally mounted in said first mentioned recess, adapted to engage said stop limiting rearward movement of said latch arm, said outwardly inclined end of said latch arm adapted to extend into a chain link and contact said hook portion a substantial distance from said pointed end of said hook portion, drawing adjacent links of a chain into engagement with said inwardly inclined walls of said shank and hook portion, normally securing the grab hook to the chain.

References Cited in the file of this patent

UNITED STATES PATENTS

| | | |
|---|---|---|
| 283,464 | Brown | Aug. 21, 1883 |
| 426,498 | Hale | Apr. 29, 1890 |
| 537,332 | Wittmann | Apr. 9, 1895 |
| 2,246,630 | Johnson | June 24, 1941 |

FOREIGN PATENTS

| | | |
|---|---|---|
| 462,790 | France | Dec. 1, 1913 |